US006256884B1

(12) United States Patent
Takeuchi et al.

(10) Patent No.: US 6,256,884 B1
(45) Date of Patent: Jul. 10, 2001

(54) NOZZLE FOR LIQUID INJECTION DEVICE AND METHOD OF PRODUCING THE SAME

(75) Inventors: Yukihisa Takeuchi, Aichi-Prefecture; Hiroyuki Tsuji, Nagoya; Nobuo Takahashi, Owariasahi, all of (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/516,106

(22) Filed: Mar. 1, 2000

Related U.S. Application Data

(63) Continuation of application No. PCT/JP99/03600, filed on Jul. 2, 1999.

(30) Foreign Application Priority Data

Jul. 6, 1998 (JP) ........................ 10-190886

(51) Int. Cl.[7] ........................ B23P 15/16
(52) U.S. Cl. ........................ 29/890.143; 29/890.142
(58) Field of Search ........................ 29/890.142, 890.143, 29/505; 72/327, 335; 239/DIG. 19, 601, 595, 596, 533.12, 533.14; 264/154, 155, 156

(56) References Cited

U.S. PATENT DOCUMENTS

| | | | | |
|---|---|---|---|---|
| 1,802,961 | * | 4/1931 | Taylor | 29/890.142 |
| 2,065,915 | * | 12/1936 | Weston | 29/890.142 |
| 3,834,629 | * | 9/1974 | Hellman et al. | 239/595 |
| 3,947,940 | * | 4/1976 | Augustine | 29/890.43 |
| 3,978,705 | * | 9/1976 | Pearce et al. | 72/325 |
| 4,010,298 | * | 3/1977 | Angle | 264/155 |
| 4,284,239 | * | 8/1981 | Ikenchi | 239/DIG. 19 |
| 5,402,943 | * | 4/1995 | King et al. | 239/596 |
| 5,603,882 | * | 2/1997 | Takano et al. | 264/155 |
| 5,833,148 | * | 11/1998 | Steinhilber et al. | 239/601 |

FOREIGN PATENT DOCUMENTS

| | | |
|---|---|---|
| 64-8953 | 1/1989 | (JP) . |
| 7-205095 | 8/1995 | (JP) . |
| 7-227651 | 8/1995 | (JP) . |

* cited by examiner

*Primary Examiner*—I Cuda Rosenbaum
*Assistant Examiner*—Trinh Nguyen
(74) *Attorney, Agent, or Firm*—Burr & Brown

(57) ABSTRACT

A method for producing a nozzle having a projecting tip part, including the steps of disposing a ceramic green sheet between a first die and a stripper containing a first punch, moving the first punch through a first surface of the ceramic green sheet to form a hole therethrough, inverting the ceramic green sheet, disposing the inverted ceramic green sheet between a second die and a stripper containing a second punch, the second die having a cavity in the shape of a negative configuration of the projecting tip part, moving the second punch through the hole formed in the ceramic green sheet to force a portion of the ceramic green sheet into the cavity of the second die and form the projecting tip part, and baking the ceramic green sheet to form the nozzle.

4 Claims, 3 Drawing Sheets

NOZZLE FOR LIQUID INJECTION DEVICE AND METHOD OF PRODUCING THE SAME

CROSS REFERENCE TO RELATED APPLICATION

This is a continuation application of International Application PCT/JP99/03600, with an international filing date of Jul. 2, 1999.

TECHNICAL FIELD

The present invention relates to a nozzle for a liquid injection device, a method for producing the nozzle, and a liquid injection device having the nozzle.

BACKGROUND ART

There has been hitherto known a liquid injection device as a device for discharging liquid as fine particles. For example, such a device is disclosed in Japanese Patent Laid-Open No. 6-40030. However, in some cases, air is compulsorily sent to a portion around a liquid injection hole, i.e., a tip of a nozzle for the purpose of evaporation or drying of injected liquid, concentration of solid components contained in the liquid, promotion of momentary movement of the injected liquid, or the like. Since a tip part of the nozzle is formed to have the same height as an outer frame of a unitarily molded device as shown in FIG. 3 in each of these devices, liquid injected along the outer frame is prone to form a thin film due to its own surface tension.

Once such a film is formed, the film acts mutually with liquid subsequently injected. Therefore, injected particles become large or small due to evaporation of the injected liquid in the periphery of the nozzle, scattering of injected particles, or an integrated action of these phenomena, and thereby injection of liquid as uniform particles is hindered. Under certain circumstances, injected liquid forming a film is dried and sticks to the periphery of a hole of the nozzle. In such a case, since a nozzle has a very small caliber by nature, dried injected liquid adheres to a tip part of the nozzle, and thereby smooth injection operation of liquid is hindered. In the worst case, the nozzle is completely clogged, and thereby there is caused a problem of incapable desired operation, for example, incapable production of a powder having an aimed particle size in the case of producing a dried powder.

Therefore, the present invention aims to provide a ceramic nozzle for a liquid injection device which is free from the problems that injection of liquid as uniform particles is hindered because of evaporation of the injected liquid in the periphery of the nozzle, scattering of injected particles, or the like, due to adhesion of liquid in the periphery of a tip part of the nozzle; injected liquid is dried and adheres to a tip part of the nozzle, and thereby smooth injection operation of liquid is hindered; or that the nozzle is completely clogged, and thereby desired operation is hindered; and the like.

DISCLOSURE OF INVENTION

The present invention has been made in view of the aforementioned problems and has been completed by finding out that the above object can be achieved by forming a projected part in a tip part of a nozzle for a liquid injection device.

That is, as the first aspect of the present invention, there is provided a nozzle for a liquid injection device, wherein a tip part of the nozzle provides a projected part.

As the second aspect of the present invention, there is further provided a nozzle for a liquid injection device, wherein an internal surface of the projected part is tapered toward a narrowed injection port, and a cross-section perpendicular to a liquid injection direction of the projected part is almost circular.

As the third aspect of the present invention, there is furthermore provided a method for producing a nozzle having a projected part in a tip part, comprising:

- disposing a ceramic green sheet (11) to be used as a bottom part of a liquid injection device to which a nozzle is attached between a die (2) and a stripper (3) storing a punch (4) therein,
- moving the punch (4) to form a hole forming the nozzle in the green sheet (11),
- disposing the green sheet between a die (2') having a cavity having a reversed configuration of a projected part and a stripper (3') storing a punch (5) therein so that the punch (5) is inserted in the green sheet in the direction opposite to the direction in which the punch (4) is inserted in the green sheet,
- moving the punch (5) to obtain a configuration of the nozzle, and
- baking the green sheet.

As the fourth aspect of the present invention, there is furthermore provided a method for producing a nozzle having a projected part in a tip part thereof, wherein the stripper (3) or the stripper (3') mechanically stops just before the green sheet (11), and then only the punch (4) or the punch (5) is moved to machine the green sheet.

As the fifth aspect of the present invention, there is furthermore provided a method for producing a nozzle, wherein the green sheet is prepared by using a ceramic powder having an average particle diameter of 0.2 μm–1.0 μm.

There is furthermore provided a liquid injection device having a nozzle of the first or second aspect of the invention.

BRIEF DESCRIPTION OF DRAWINGS

FIG. 2(*a*) shows a process of disposing a green sheet 11 between a die 2 and a stripper 3 storing a punch 4 therein; FIG. 2(*b*) shows a process of forming a hole constituting the nozzle in the green sheet 11; FIG. 2(*c*) shows a process for forming a projected part on the nozzle; and FIG. 2(*d*) is a partially enlarged view of the green sheet 11 in which a nozzle of the present invention after finishing the above processes.

BEST MODE FOR CARRYING OUT THE INVENTION

The present invention is hereinbelow described on the basis of the present invention.

Figure 1:
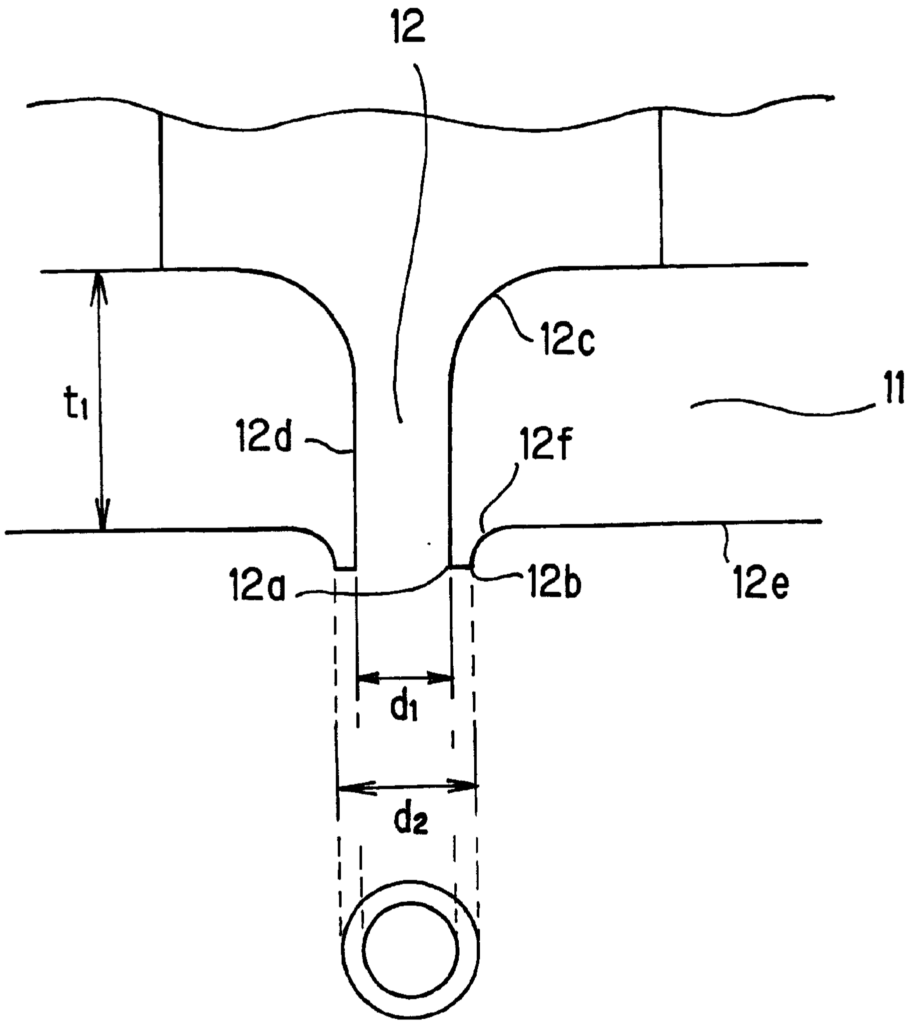
FIG. 1 is a partial sectional view for showing a structure of a nozzle having a projected part of the present invention.
Figure 2A:
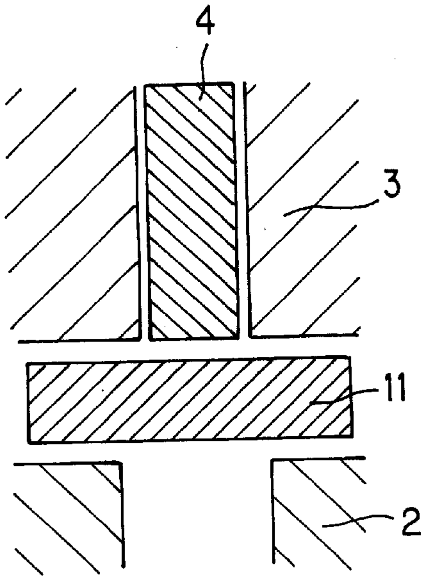
FIGS. 2(*a*)–(*d*) schematically show processes of producing a green sheet for a nozzle having a projected part of the present invention.
Figure 2B:
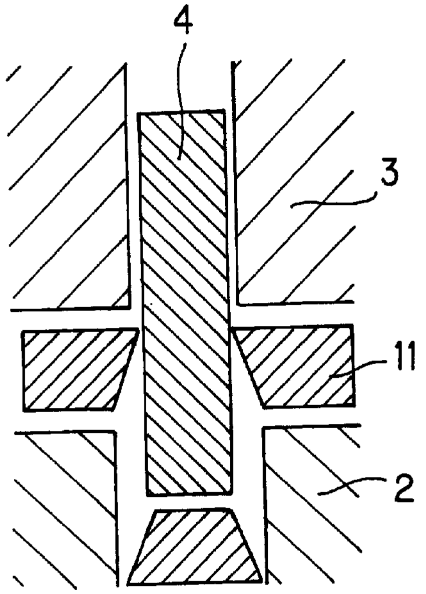
Figure 2C:
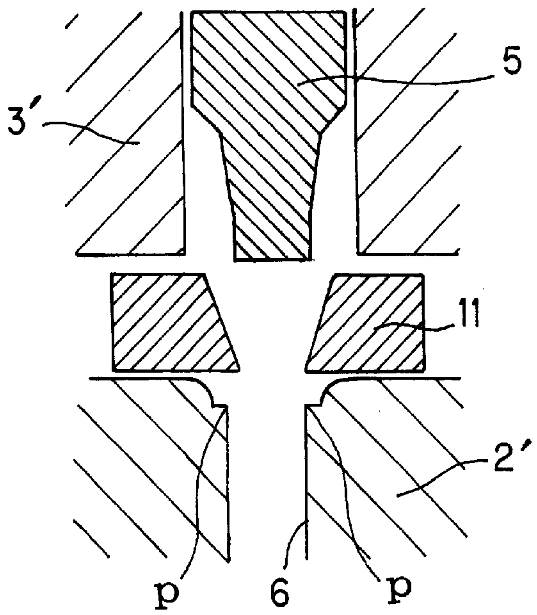
Figure 2D:
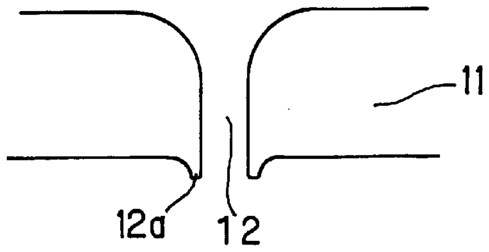

As shown in FIG. 1, a tip part of a nozzle 12 for a liquid injection device of the present invention forms projected parts 12*a*, 12*b*, and an internal surface of the projected part is tapered toward an a narrowed injection port.

A nozzle of the present invention has an inner diameter $d_1$ of 25 μm–300 μm, a thickness $t_1$ of a green sheet of 50 μm–200 μm, and an aspect ratio of the thickness to the inner diameter ($t_1/d_1$: hereinbelow referred to simply as aspect ratio) of 0.5–2.5.

A method for producing a nozzle of the present invention includes the steps of: disposing a ceramic green sheet 11 to be used as a bottom part of a liquid injection device to which a nozzle is attached between a die 2 and a stripper 3 storing a punch 4 therein as shown in FIG. 2 (*a*), moving the punch 4 to form a hole forming a nozzle in the green sheet 11 as shown in FIG. 2(*b*), disposing the green sheet between a die 2' having a cavity having a negative configuration of a projected part and a stripper 3' storing a punch 5 therein so that the punch 5 is inserted in the green sheet 11 in the direction opposite to the direction in which the punch 4 is inserted in the green sheet as shown in FIG. 2(*c*), moving the punch 5 to obtain a configuration of the nozzle, and baking the green sheet.

In FIG. 2(*c*), when the punch 5 is moved down to the lowest point, a clearance between a side portion of the punch 5 and the point p of the die 2' is within the range from 2 to 5 times the maximum particle diameter of a ceramic powder forming the green sheet, that is, within the thickness range in which the green sheet shows an extreme decrease in strength. Vacuum absorption upon punching the green sheet can prevent refuse from adhering to the hole of the green sheet or from rising up to the upper surface of the green sheet. It is also effective in preventing the refuse from adhering to a tip part of the punch. A tapered shape of the die to be wider toward the direction of punching is more effective. A nozzle can be produced more precisely if the stripper 3 or the stripper 3' mechanically stops just before the green sheet 11, and then only the punch 4 or the punch 5 is moved to machine the green sheet in the method.

As shown in FIG. 1, in a nozzle produced by the above method, a communicating portion 12*d* of the nozzle hole is tapered to be narrower toward the projected parts. The projected parts 12*a*, 12*b* are edges each having a radius of curvature of 10 μm or less. The tapering is about 1/30–1/10. Further, an evading portion 12*f* locating outside the projected part from the projected part 12*b* to an evading curved portion 12*e* preferably has a suitable radius of curvature R so as to prevent the ceramic from cracking due to stress upon firing. Such R is within the range from t1/3 to t1/10. A tip part baked. Such R is within the range from $t_1/3$ to $t_1/10$. A tip part of the projected part preferably has a length corresponding to a radius of curvature R of 12 C arranged to reduce a resistance in flow path. Though a cross section of the nozzle portion may be any of circular, oval, square, and rectangular, it is preferably circular in view of workability and liquid injection efficiency.

An injection device is generally unitarily baked to produce a nozzle having a projected part of the present invention by the use of a thus produced green sheet 11. An injection device to be unitarily baked is produced according to a method, for example, the one disclosed in paragraphs 0010–0013 of the specification for the Japanese Patent Application 9-335210.

Since a ceramic material to be used for producing a green sheet employs a machining method by which a relatively high shearing force is applied when a nozzle having the aforementioned shape and size, a green sheet having a shearing stress of 2–10kgf/mm$^2$ can be suitably used.

As a suitable raw material for preparing a green sheet having such a shearing stress, there can be suitably used a material, for example, zirconia, alumina, silicon nitride, and silicon carbide.

A method for producing a liquid injection device having a nozzle having a projected part of the present invention, where a green sheet produced in the aforementioned method, is hereinbelow described with reference to FIG. 4.

A pump portion 21 is formed by stacking a nozzle plate 13 which is a nozzle portion 11 formed of a thin plate-like green sheet prepared with a ceramic having an average diameter of about 0.2 μm–1.0 μm and which is provided with a nozzle hole 12 formed in the aforementioned manner; a spacer plate 25 which is formed of a ceramic green sheet and provided with a cavity portion 15, and a sealing plate 23 which covers the window portion 28 by being superposed on one side of the spacer plate 25 and is provided with a liquid inflow port 16. The thus obtained structure is unitarily baked.

On the outer surface of sealing plate 23 the thus obtained structure, a piezoelectric/electrostrictive element 22 having a lower element 31, a piezoelectric/electrostrictive layer 32, and an upper element 33 is disposed.

According to such a liquid injection device, a piezoelectric/electrostrictive layer 32 is deformed, and the cavity (liquid pressure chamber) 15 formed with the window portion 28 being covered decreases in capacity when an electric field is generated between the upper electrode 33 and the lower electrode 31, and thereby liquid filling a cavity 15 is injected from the nozzle hole 12.

As described above, in the present invention, a liquid injected device may be made of zirconia ceramics as a raw material. In this case, a device after being baked is excellent in chemical resistance, thermal resistance, and tenacity. Therefore, even if a solvent for liquid to be dried uses a liquid used for preparing a precursor of a ceramic material, such as acetone type, hydrochloric acid type, or the like, or even if liquid for combustion is kerosine gasoline or, it is possible to use it.

Next, specific effects of the present invention are hereinbelow described with an embodiment where a powder is produced by the use of a liquid injection device having such a structure having a nozzle of the present invention as described above.

Figure 3:
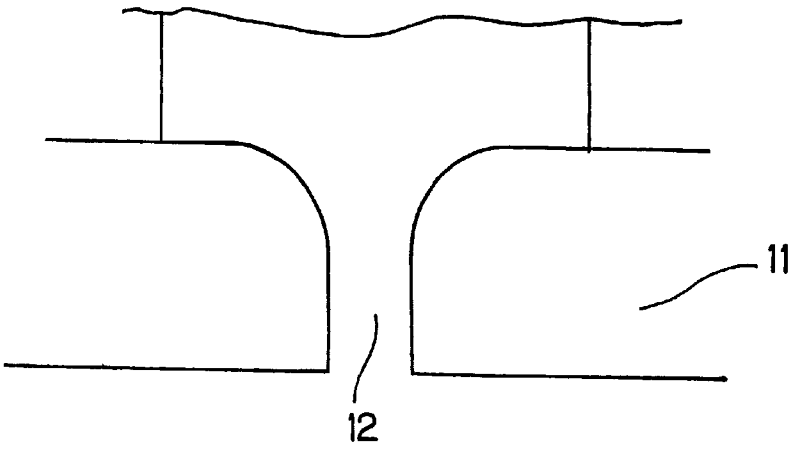
Fig.3 Prior Art
FIG. 3 is a partially enlarged view showing a structure of a tip part of a conventional nozzle.
Figure 4:
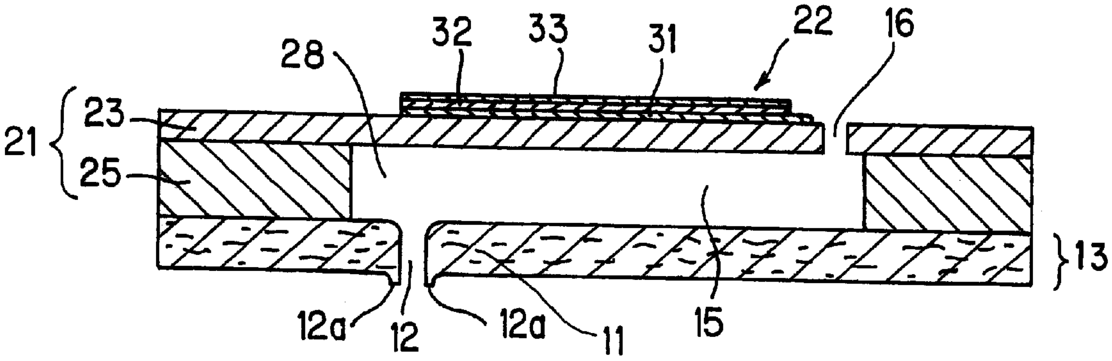
FIG. 4 is a schematic view showing a structure of a liquid injection device having a nozzle having a projected part of the present invention.

There was used a powder-producing device having a structure shown in FIG. 3 attached to the application of Japanese Patent Application 9-335210, on which a liquid injection device is mounted thereon as shown in FIG. 4 of the present invention.

Ethyl alcohol solution of zirconium chloride is intermittently sprayed inside a quartz furnace having an external heater by an electromagnetic shutter to give liquid drops. The liquid drops in the furnace were dried and thermally decomposed to obtain a zirconia ceramic powder A.

The obtained zirconia ceramic powder A had an average particle diameter of 20 μm and was so uniform that the particle-size distribution was within ±10% of the average particle diameter.

After the powder was produced, conditions of adhesion of solid components in a tip part of the nozzle were observed, and no substantial adhesion of solid components was found.

INDUSTRIAL APPLICABILITY

As described above, in a nozzle of the present invention, liquid injected at a tip part of the nozzle does not substantially adhere as a solid substance even if the nozzle is mounted in a device to which air is constantly applied in a direction perpendicular to the direction where liquid is injected, for example a drying device.

That is, by using a nozzle of the present invention, there is exhibited an excellent effect of avoiding a hindrance that smooth operation for discharging liquid is hindered due to sticking of dried injection liquid to a tip part of the nozzle or that desired operation is made impossible due to complete clogging of the nozzle, or the like.

Further, a liquid injection device having a nozzle with a projected part of the present invention exhibits an excellent effect of being capable of long continuous driving because it does not need to stop driving so as to remove deposits while the device is used since the device is substantially free from adhesion of injected liquid which is solidified in a tip part of a nozzle.

What is claimed is:

1. A method for producing a nozzle having a projecting tip part, comprising the steps of:

disposing a ceramic green sheet between a first die and a stripper containing a first punch;

moving the first punch through a first surface of said ceramic green sheet to form a hole therethrough;

inverting said ceramic green sheet;

disposing the inverted ceramic green sheet between a second die and a stripper containing a second punch, the second die having a cavity in the shape of a negative configuration of the projecting tip part;

moving the second punch through the hole formed in said ceramic green sheet to force a portion of said ceramic green sheet into the cavity of the second die and form the projecting tip part; and baking said ceramic green sheet to form said nozzle.

2. The method of claim 1, wherein the stripper is spaced from said ceramic green sheet when the first punch and the second punch move through said ceramic green sheet.

3. The method of claim 1, wherein said ceramic green sheet is prepared by using a ceramic powder having an average particle diameter of 0.2 μm–1.0 μm.

4. The method of claim 2, wherein said ceramic green sheet is prepared by using a ceramic powder having an average particle diameter of 0.2 μm–1.0 μm.

* * * * *